(12) United States Patent
Carlsson et al.

(10) Patent No.: US 8,623,308 B2
(45) Date of Patent: Jan. 7, 2014

(54) PROCESS FOR REMOVING MERCAPTANS FROM A GAS STREAM COMPRISING NATURAL GAS ON AN INERT GAS

(75) Inventors: Anders Carlsson, Amsterdam (NL); Gijsbert Jan Van Heeringen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1176 days.

(21) Appl. No.: 11/659,059

(22) PCT Filed: Aug. 2, 2005

(86) PCT No.: PCT/EP2005/053770
§ 371 (c)(1),
(2), (4) Date: Jan. 31, 2007

(87) PCT Pub. No.: WO2006/013206
PCT Pub. Date: Feb. 9, 2006

(65) Prior Publication Data
US 2009/0047201 A1    Feb. 19, 2009

(30) Foreign Application Priority Data

Aug. 2, 2004  (EP) .................................... 04254645

(51) Int. Cl.
*B01D 53/14* (2006.01)
*B01D 53/52* (2006.01)
*C01B 7/00* (2006.01)

(52) U.S. Cl.
USPC ................. 423/242.4; 423/242.1; 423/244.09

(58) Field of Classification Search
USPC ................. 423/242.1, 242.4, 244.09
See application file for complete search history.

(56) References Cited

U.S. PATENT DOCUMENTS

| | | | | |
|---|---|---|---|---|
| 2,060,091 A | * | 11/1936 | Lyman .......................... | 208/245 |
| 3,387,917 A | * | 6/1968 | Walles et al. ................. | 423/226 |
| 4,176,087 A | * | 11/1979 | Dew et al. ..................... | 502/244 |
| 4,311,680 A | | 1/1982 | Frech et al. ................... | 423/320 |
| 4,313,820 A | | 2/1982 | Farha, Jr. et al. .............. | 208/213 |
| 4,346,155 A | * | 8/1982 | Chapman et al. ............... | 430/17 |
| 4,356,155 A | * | 10/1982 | Blytas et al. .................. | 423/576.2 |
| 6,531,052 B1 | * | 3/2003 | Frye et al. ..................... | 208/189 |
| 6,638,419 B1 | * | 10/2003 | Da Silva et al. ............. | 208/208 R |
| 6,702,937 B2 | * | 3/2004 | Johnson et al. ................. | 208/97 |
| 6,962,680 B1 | * | 11/2005 | Ishigaki et al. ............. | 423/244.09 |
| 2004/0007503 A1 | | 1/2004 | Uzio et al. ................. | 208/216 R |
| 2004/0007504 A1 | | 1/2004 | Uzio et al. ................. | 208/216 R |
| 2004/0040889 A1 | | 3/2004 | Groten ......................... | 208/210 |
| 2005/0220704 A1 | * | 10/2005 | Morrow et al. ............. | 423/658.3 |

FOREIGN PATENT DOCUMENTS

| | | | | |
|---|---|---|---|---|
| CN | 1208360 | | 2/1999 | ............ B01D 53/14 |
| EP | 229587 | | 7/1987 | ............ B01D 53/14 |
| GB | 1563251 | | 3/1980 | ............ B01D 53/34 |
| JP | 03 033191 | | 2/1991 | ............... C10K 1/32 |
| JP | 04 280080 | | 10/1992 | ............ C10G 11/00 |
| JP | 04280082 | | 10/1992 | ............ H01M 10/40 |
| WO | 9726069 | | 7/1997 | ............ B01D 53/14 |
| WO | WO 97/26069 | * | 7/1997 | ............ B01D 53/14 |
| WO | WO9726069 | * | 7/1997 | |
| WO | WO 02/32810 | * | 4/2002 | |
| WO | WO03050207 | | 6/2003 | ............ C10G 45/02 |
| WO | 2004047955 | | 6/2004 | ............ B01D 53/14 |

* cited by examiner

*Primary Examiner* — Bijay Saha
(74) *Attorney, Agent, or Firm* — Charles W. Stewart

(57) ABSTRACT

The invention provides a process for removing mercaptans from a gas stream comprising natural gas or inert gas and mercaptans, the process comprising the steps of: (a) contacting a first gas stream comprising natural gas or inert gas and mercaptans with a hydrodesulphurization catalyst in the presence of hydrogen in a hydrodesulphurization unit to obtain a second gas stream comprising natural gas or inert gas, which is depleted of mercaptans and enriched in $H_2S$; (b) removing $H_2S$ from the second gas stream comprising natural gas or inert gas in a $H_2S$ removal unit to obtain a purified gas stream comprising natural gas or inert gas, which is depleted of mercaptans.

11 Claims, No Drawings

PROCESS FOR REMOVING MERCAPTANS FROM A GAS STREAM COMPRISING NATURAL GAS ON AN INERT GAS

The present application claims priority of European Patent Application No. 04254645.7 filed 2 Aug. 2004.

The invention relates to a process for removing mercaptans from a gas stream comprising natural gas or an inert gas, as well as mercaptans.

The removal of mercaptans from a gas stream, especially from natural gas, is of importance in view of increasingly stringent environmental and technical requirements. The concentration ranges of mercaptans in new sources of gas can be substantially higher than the ranges which were hitherto known. Thus, mercaptan removal is applied in many industrial processes.

For example, mercaptan removal from a natural gas stream is important when the natural gas stream is used for the generation of synthesis gas. Synthesis gas may for example be converted to hydrocarbons in a catalytic process, known in the art as a Fischer-Tropsch process. If mercaptans are present in the natural gas, $H_2S$ will be formed from the mercaptans in the gasifier. $H_2S$ may bind irreversibly on Fischer-Tropsch catalysts and cause sulphur poisoning. This results in a deactivated catalyst, which severely hampers the catalytic process. In such cases, removal of mercaptans to very low levels is required.

In cases where the natural gas intended for domestic use, the toxicity and smell of mercaptans renders their presence highly undesirable. Mercaptans, due to their odorous nature, can be detected at parts per million concentration levels. Thus, it is desirable for users of natural gas to have concentrations of mercaptans lowered to e.g. less than 5, or even less than 2 ppmv.

Mercaptan removal is also important in cases where the gas stream is an inert gas stream, for example a carrier gas stream that has been used to strip a mercaptan comprising reactor bed and is thus loaded with mercaptans. The removal of mercaptans from such a loaded inert gas stream is necessary to be able to use the gas stream again as stripping gas.

In the art, removal of mercaptans from a mercaptan-loaded gas stream exiting a mercaptan-adsorption unit is usually achieved by treating the loaded gas stream in an acid gas removal unit, generally an acid gas removal unit using chemical of physical absorption. In most cases, it is considered more efficient to use as an acid gas removal unit a unit that is also used for the bulk removal of contaminants such as carbon dioxide and hydrogen sulphide. These processes in general are able to remove carbon dioxide and/or hydrogen sulphide without large difficulties; however, they suffer from the fact that they do not efficiently remove mercaptans. In particular, the removal of mercaptans from a loaded gas stream comprising a substantial amount of mercaptans, typically up to 40 vol %, is difficult to achieve. Removal of mercaptans from such a stream to low levels, in the range of 1 ppmv or below, is very difficult when using an acid gas removal unit. Deep removal of mercaptans from a hydrocarbon stream using a physical solvent often results in significant co-absorption of hydrocarbons, thus resulting in hydrocarbon losses from the process stream.

Processes for the removal of mercaptans from natural gas or an inert gas are known in the art and are generally based on physical absorption, solid bed adsorption and/or chemical reaction.

Physical absorption processes suffer from the fact that they frequently encounter difficulties in removing mercaptans to low concentration. Generally, large reactors are needed to achieve the desired low concentrations.

Solid bed adsorption processes suffer from the fact that they are only able to adsorb limited amounts of undesired compounds, while regeneration is relatively cumbersome. Especially large solid beds take relatively more time for regeneration and disproportionately high quantities of regeneration gas are needed. For example, in U.S. Pat. No. 4,311,680 a process is described for the removal of hydrogen sulphide and mercaptans by using an iron oxide fixed bed, followed by regeneration of the absorbent by reaction with hydrogen peroxide. Such a process needs large amounts of absorbents, while regeneration is expensive and laborious.

Chemical processes in general are able to remove carbon dioxide and/or hydrogen sulphide without much difficulty. However, they suffer from the fact that they do not effectively remove mercaptans and often produce large amounts of waste. For example, in EP 229,587 a process is described wherein the gas stream is treated with an alkaline aqueous liquid. A drawback of this process is the high consumption of alkaline chemicals needed to remove mercaptans.

Therefore, there remains a need in the art for a simple and efficient process for removing mercaptans from a gas stream comprising natural gas or an inert gas, as well as mercaptans.

To this end, the invention provides a process for removing mercaptans from a gas stream comprising natural gas or inert gas and mercaptans, the process comprising the steps of:

(a) contacting a first gas stream comprising natural gas or inert gas and mercaptans with a hydrodesulphurisation catalyst in the presence of hydrogen in a hydrodesulphurisation unit to obtain a second gas stream comprising natural gas or inert gas, which is depleted of mercaptans and enriched in $H_2S$;

(b) removing $H_2S$ from the second gas stream comprising natural gas or inert gas in a $H_2S$ removal unit to obtain a purified gas stream comprising natural gas or inert gas, which is depleted of mercaptans.

The process according to the invention enables removal of mercaptans from a first gas stream comprising natural gas or an inert gas, as well as mercaptans, typically to a level of below 5 ppmv, or even below 1 ppmv.

The process furthermore enables producing a purified gas stream having a total concentration of mercaptans and $H_2S$ of below 1 ppmv.

The process according to the inventions offers a relative simple and efficient way to remove mercaptans from a first gas stream loaded with mercaptans that has been used to regenerate a mercaptan-adsorbent in an adsorbent bed in.

Reference herein to mercaptans (RSH) is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans.

The invention especially involves removal of methyl mercaptan (R=methyl), ethyl mercaptan (R=ethyl), normal- and iso-propyl mercaptan (R=n-propyl and iso-propyl) and butyl mercaptan (n=butyl) isomers from the first gas stream.

The concentration of mercaptans and the type of mercaptans present in the first gas stream can vary and depends on the source from which the first gas stream originates.

Typically, the concentration of mercaptans in the first gas stream is in the range of from 2 ppmv to 40 vol %, preferably of from 10 ppmv to 1 vol %, more preferably of from 50 ppmv to 0.5 vol %, based on the total volume of the first gas stream.

The first gas stream may be any gas natural gas stream comprising natural gas or inert gas and mercaptans.

Reference herein to inert gas is to any gas which will show negligible or no chemical reaction when brought into contact with a hydrodesulphurisation catalyst used in step (a). Examples of such inert gases are gases selected from the group of helium in the periodic table, nitrogen and hydrocarbonaceous gases used for example as stripping gas. Preferably, the inert gas comprises at least 80%, more preferably at least 90% of gases selected from the group of helium in the periodic table, nitrogen and hydrocarbonaceous gases used for example as stripping gas. It will be understood that synthesis gas is not an inert gas because synthesis gas may react with a hydrodesulphurisation catalyst. Thus, preferably the inert gas does not comprise synthesis gas.

The composition of natural gas depends on the source and can vary. Generally, natural gas comprises mainly methane and can further comprise other components such as lower hydrocarbons (e.g. ethane, propane, butane, pentane), nitrogen, carbon dioxide, sulphur contaminants and traces of oxygen and hydrogen. The amount and type of sulphur contaminants can vary. Common sulphur contaminants are $H_2S$, mercaptans and COS.

The process according to the invention is especially suitable for removing mercaptans from first gas streams exiting a gas-treating unit.

Reference herein to a gas-treating unit is to a unit wherein sulphur contaminants are removed from a feed gas stream.

In one embodiment, the gas-treating unit comprises one or more mercaptan-adsorbent beds, henceforth referred to as a mercaptan adsorption unit. In this embodiment, the first gas stream comprises inert gas and is loaded with mercaptans exiting the mercaptan adsorption unit. Suitably, the inert gas comprises at least 80% nitrogen or at least 80% of a hydrocarboneceous gas.

Suitable mercaptan adsorbent materials are known in the art and include materials based on silica, silica gel, alumina or silica-alumina.

Preferably, molecular sieves are used in the mercaptan-adsorbent beds. Molecular sieves having an average pore diameter of 5 Å or more are preferred.

Typically, the process in the mercaptan adsorption unit results in a gas stream substantially free of mercaptans and mercaptan-adsorbent beds now loaded with mercaptans. The gas stream substantially free of mercaptans can leave the mercaptan-adsorption unit and can be further processes for example by liquification in an LNG unit or can be used in further catalytic or non-catalytic processes.

Adsorption of mercaptans on the mercaptan adsorbents can be reverted by contacting the mercaptan-loaded beds with an inert gas stream at elevated temperature or reduced pressure. Thereby, mercaptans are transferred from the mercaptan-adsorbent beds to the inert gas stream. The transfer of mercaptans to the inert gas stream results in an inert gas stream loaded with mercaptans, which gas stream is then the first gas stream. For the purposes of the invention, it is preferred to use as an inert gas stream a hydrocarbonaceous stream, especially part of the purified hydrocarbonaceous stream leaving the mercaptan-adsorption unit.

The process according to the invention enables removal of mercaptans from a mercaptan loaded inert gas stream to low levels, thereby producing a purified gas stream having low levels of mercaptans, typically below 5 ppmv or even below 1 ppmv, without the need for cumbersome or expensive processes.

In another embodiment of the invention, the first gas stream is a gas stream exiting a so-called acid gas removal unit. Reference herein to an acid gas removal unit is to a gas-treating unit wherein an acid gas removal process is applied. Acid gas removal is generally achieved using one or more solvent formulations based on chemical or physical solvents to remove a large part of the $H_2S$ and part of the RSH from a feed gas stream, generally a natural gas stream, to the solvent. This results in a solvent loaded with acid gas components, among which $H_2S$ and RSH. The acid gas removal will usually be carried out as a continuous process, which also comprises regeneration of the loaded absorbing liquid. Loaded absorbing liquid is regenerated by transferring at least part of the contaminants to a regeneration gas stream, typically at relatively low pressure and high temperature. The regeneration results in a gas stream enriched in mercaptans. The gas stream thus generated can be used as a first gas stream. Typically, a first gas stream thus generated comprises up to 10 ppmv of $H_2S$.

Solvents for acid gas removal are known in the art and include chemical or physical solvent or mixtures thereof. Mixtures of chemical and physical solvent are especially suitable for feed gas streams comprising carbon dioxide. They perform very well at high pressures, especially between 20 and 90 bara. Preferably, a mixture comprising 15 to 35 wt % of a physical solvent, based on the total mixture and 40 to 55 wt % of an amine, based on total mixture, is used. Acid gas processes using chemical and physical solvents are described in for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

In the process according to the invention, the first gas stream enters a hydrodesulphurisation unit comprising one or more beds of a hydrodesulphurisation catalyst. Fixed beds of hydrodesulphurisation are preferred because they allow a relatively simple operation and maintenance.

Typically, the operating temperature of the hydrodesulphurisation unit is in the range of from 100 to 500° C., preferably of from 300 to 400° C., more preferably in the range of from 320 to 380° C.

Typically, the operating pressure of the hydrodesulphurisation unit is in the range of from 10 to 100 bara, preferably of from 20 to 80 bara.

In the hydrodesulphurisation unit, mercaptans (RSH) are catalytically converted to $H_2S$ according to reaction (1). In addition, if nitrogen is present, nitrogen is converted to $NH_3$ according to reaction (2).

$$RSH + H_2 \rightarrow H_2S + RH \quad (1)$$

$$2N_2 + 3H_2 \rightarrow 2NH_3 \quad (2)$$

R is an alkyl group, preferably selected from the group of methyl, ethyl, n-propyl, i-propyl and butyl.

Typically, a slight stochiometric excess of $H_2$ is used to ensure optimal conversion of RSH. Typically, the ratio of $H_2$ to RSH is in the range of from 1.01:1.0 to 1.3:1.0, preferably from 1.05:1.0 to 1.2:1.0. The gas stream exiting the hydrodesulphurisation unit is enriched in $H_2S$. The thus-obtained gas stream enriched in $H_2S$ may be used directly as the second gas stream in step (b). Alternatively, the gas stream exiting the hydrodesulphurisation unit is sent to a separator to obtain a hydrogen-rich gas stream and a gas stream enriched in $H_2S$, which gas stream is used as second gas stream in step (b). The hydrogen-rich gas stream may then be recycled to the hydrodesulphurisation unit. This enables a continuous process and minimises the presence of $H_2$ in the second hydrocarbonaceous gas stream. Furthermore, the relatively expensive $H_2$ is not wasted.

Any hydrodesulphurisation catalyst known in the art may be used. Typically, the hydrodesulphurisation catalyst comprises a Group VIII and a Group VIB hydrogenation metal, such as cobalt-molybdenum, nickel-molybdenum or nickeltungsten, and optionally a catalyst support, for example alumina, titania, silica, zirconia or mixtures thereof. Alumina or silica-alumina are preferred. These hydrodesulphurisation catalysts have been found to show a high activity for the conversion of mercaptans to $H_2S$. Preferably, the hydrodesulphurisation catalyst comprises cobalt and molybdenum or tungsten as hydrogenation metals, since these catalysts have been found to effect optimal conversion of the mercaptans in the first gas stream.

It will be understood that other contaminants present in the first gas stream can react when contacted with the hydrodesulphurisation catalyst. For example, $CO_2$ can be converted to COS in the hydrodesulphurisation unit. Therefore, it is preferred that the $CO_2$ concentration in the first gas stream below 8 vol %, preferably below 3 vol %. Suitably, the $CO_2$ concentration in the first gas stream is in the range of from 0.005 vol % to 8 vol %, preferably from 0.01 vol % to 3 vol %, based on the total first gas stream. This will result in an acceptable COS amount in the second gas stream. The absence of $CO_2$ would minimise COS formation.

In step (a), a second gas stream is obtained which is depleted of mercaptans and enriched in $H_2S$. Typically, the amount of mercaptans in the second gas stream is below 10 ppmv, suitably in the range of from 1 ppbv to 10 ppmv, preferably of from 5 ppbv to 5 ppmv. Typically, the amount of $H_2S$ in the second gas stream is in the range of from 100 ppbv to 40 vol %.

The second gas stream is sent to an $H_2S$ removal unit. Suitable $H_2S$ removal units include reactors or contactors comprising means to effectively remove $H_2S$ from the gas stream.

Removal of $H_2S$ from the second gas stream can be accomplished in various ways. Four preferred methods for $H_2S$ will be described: (i) using adsorbent beds; (ii) using direct oxidation; (iii) using biological desulphurisation and (iv) using refrigerated methanol.

In method (i), $H_2S$ is removed in the $H_2S$ removal unit using one or more $H_2S$ adsorbent beds, for example one or more refractory adsorbent beds. Suitable solid adsorbents comprise one or more metals or oxides of metals or combinations thereof, the metals being selected from the group of Ag, Sn, Mo and Zn. A preferred solid adsorbent is ZnO, because of its good performance.

The $H_2S$ adsorbent may be supported on an inorganic support material in order to, for example, increase the surface area, pore volume and pore diameter. Preferably, an inorganic refractory support material selected from the group of alumina, silica, titania, zirconia, carbon, silicon carbide and kieselguhr is used. Either one type of support materials or mixtures of different the support materials can be used.

In cases where the first gas stream comprises substantial amounts of $CO_2$, typically in the range of from about 5 to 8 vol %, based on the first gas stream, is advantageous to use a mixed bed of $H_2S$ adsorbent and titania. As discussed before, the hydrodesulphurisation catalyst can convert $CO_2$ to COS, which would result in a substantial amount of COS in the second gas stream. The presence of COS is not desirable. It has been found that a mixed bed of $H_2S$ adsorbent and titania enables the removal of COS and $H_2S$. The mixed bed can for example be a bed comprising an admixture of $H_2S$ adsorbent and titania or a bed comprising alternating layers of $H_2S$ adsorbent and titania.

Generally, when using a refractory oxide $H_2S$ adsorbent, $H_2S$ is removed from the second gas stream at a temperature in the range of from 70 to 260° C., preferably from 140 to 240° C. The advantage of using a refractory oxide $H_2S$ adsorbent to remove $H_2S$ is that the second gas stream only needs to be cooled slightly.

In method (ii), $H_2S$ is removed in the $H_2S$ removal unit through a process based on the direct oxidation of $H_2S$. For example, the second gas stream is subjected to a redox process in which the $H_2S$ is directly oxidised to elemental sulphur using an chelating iron compound while the ferric ions are reduced, followed by regeneration of the ferric ions by oxidation with air. This process is known as the SulFerox process.

In method (iii), $H_2S$ is removed in the $H_2S$ removal unit through a combination of scrubbing the second gas stream gas with an alkali compounds to convert $H_2S$ to $RS^-$, followed by oxidation of $RS^-$ using sulphide-oxidising bacteria as biological agent. This process is know in the art as the bio-desulphurisation, see for example WO 92/10270.

In method (iv), $H_2S$ is removed in the $H_2S$ removal unit using refrigirated methanol is used as a scrubbing solvent to remove $H_2S$ in the $H_2S$ removal unit. When using refrigirated methanol, levels of 0.1 ppmv $H_2S$ can be achieved.

The purified gas stream obtained in step (b) can be processed further in known manners. For example, the purified gas stream can be subjected to catalytic or non-catalytic combustion, to generate electricity, heat or power, or can be used for a chemical reaction or for residential use. In the event that the first gas stream comprises natural gas, the purified gas stream can also be converted to liquefied natural gas (LNG).

That which is claimed is:

1. A process for removing mercaptans from a feed gas stream comprising natural gas or inert gas having a mercaptans concentration of up to 40 vol %, the process comprising the steps of:
    (a) passing said feed gas stream to a gas treating unit, wherein said gas treating unit includes a mercaptan adsorbent bed, said adsorbent bed consisting essentially of a mercaptan adsorbent material selected from the group consisting of silica, silica gel, alumina, silica-alumina, and molecular sieve, to thereby provide a mercaptan adsorbent material loaded with mercaptan and to yield therefrom a gas stream having a mercaptans concentration of less than 5 ppmv;
    (b) ceasing said passing of said feed gas stream to said gas treating unit, and, thereafter, contacting said mercaptan adsorbent material loaded with mercaptan with an inert gas stream at an elevated temperature or reduced pressure to transfer mercaptan from said mercaptan adsorbent material loaded with mercaptan to said inert gas stream to thereby yield from said gas treating unit a first gas stream comprising mercaptans and at least 80% of gases selected from the group of helium in the periodic table, nitrogen and hydrocarbonaceous gases, wherein the concentration of $CO_2$ in the first gas stream is below 8 vol %;
    (c) contacting said first gas stream with a hydrodesulphurisation catalyst in the presence of hydrogen in a hydrodesulphurisation unit to obtain a second gas stream comprising inert gas, which is depleted of mercaptans and enriched in $H_2S$; and
    (d) removing $H_2S$ from the second gas stream in a $H_2S$ removal unit which comprises a $H_2S$ adsorbent bed which further comprises titania to obtain a purified gas stream comprising inert gas, which is depleted of $H_2S$ and mercaptans to a level of below 1 ppmv.

2. A process as recited in claim 1, wherein the hydrodesulphurisation catalyst comprises a Group VIII hydrogenation metal and a Group VIB hydrogenation metal.

3. A process as recited in claim 1, wherein the mercaptans adsorbent material is a molecular sieve having an average pore diameter of 5 Å or more.

4. A process as recited in claim 2, wherein the hydrodesulphurisation catalyst comprises a catalyst support selected from the group consisting of alumina, silica-alumina, titania, silica, ziconia, or mixtures thereof.

5. A process as recited in claim 1, wherein the operating temperature of the hydrodesulphurisation unit is in the range of from 100 to 500° C.

6. A process as recited in claim 5, wherein the operating pressure of the hydrodesulphurisation unit is in the range of from 10 to 100 bara.

7. A process as recited in claim 1, wherein said hydrodesulfurization catalyst comprises cobalt and molybdenum or tungsten, and a catalyst support comprising alumina or silica-alumina.

8. A process as recited in claim 1, wherein the $H_2S$ adsorbent bed comprises a mixed bed of $H_2S$ adsorbent and titania.

9. A process as recited in claim 8, wherein the mixed bed of $H_2S$ adsorbent comprises alternating layers of $H_2S$ adsorbent and titania.

10. A process as recited in claim 7, wherein the operating temperature of the hydrodesulphurisation unit is in the range of from 300 to 400° C. and the operating pressure of the hydrodesulphurisation unit is in the range of from 20 to 80 bara.

11. A process according to claim 3, wherein mercaptans are removed from the natural gas to a mercaptans concentration of less than 1 ppmv.

\* \* \* \* \*